US011745442B2

(12) United States Patent
Rossi et al.

(10) Patent No.: US 11,745,442 B2
(45) Date of Patent: Sep. 5, 2023

(54) HIGHLY CONTOURED COMPOSITE STRUCTURES AND SYSTEM AND METHOD FOR MAKING THE SAME

(71) Applicant: The Boeing Company, Chicago, IL (US)

(72) Inventors: Michael J. Rossi, Manhattan Beach, CA (US); Juan C. Guzman, Manson, WA (US); Kurtis S. Willden, Kent, WA (US); Douglas A. McCarville, Eastsound, WA (US)

(73) Assignee: THE BOEING COMPANY, Chicago, IL (US)

( * ) Notice: Subject to any disclaimer, the term of this patent is extended or adjusted under 35 U.S.C. 154(b) by 125 days.

(21) Appl. No.: 16/548,466

(22) Filed: Aug. 22, 2019

(65) Prior Publication Data

US 2021/0053299 A1    Feb. 25, 2021

(51) Int. Cl.
| B29C 70/46 | (2006.01) |
| B29C 70/30 | (2006.01) |
| B29C 70/44 | (2006.01) |
| B29C 70/54 | (2006.01) |
| B29D 99/00 | (2010.01) |
| B29L 31/30 | (2006.01) |

(52) U.S. Cl.
CPC ............ *B29C 70/462* (2013.01); *B29C 70/30* (2013.01); *B29C 70/446* (2013.01); *B29C 70/549* (2021.05); *B29D 99/0005* (2021.05); *B29L 2031/3085* (2013.01)

(58) Field of Classification Search
CPC . B29C 2043/3411; B29C 31/08; B29C 70/30; B29C 70/446; B26F 3/008

USPC ......................................................... 156/242
See application file for complete search history.

(56) References Cited

U.S. PATENT DOCUMENTS

| 7,861,969 | B2 | 1/2011 | Guzman et al. |
| 8,142,181 | B2 | 3/2012 | Willden et al. |
| 8,349,105 | B2 | 1/2013 | Kehrl et al. |
| 8,795,567 | B2 | 8/2014 | Bland |
| 9,090,028 | B2* | 7/2015 | McCarville ......... B32B 37/1018 |
| 9,789,673 | B2* | 10/2017 | Brufau Redondo .... B32B 37/10 |
| 9,969,133 | B2* | 5/2018 | Hedges ................... B66C 19/00 |
| 2005/0042319 | A1* | 2/2005 | Brussel ................... B29C 31/08 |
| | | | 425/110 |
| 2010/0102482 | A1 | 4/2010 | Jones et al. |

(Continued)

FOREIGN PATENT DOCUMENTS

| EP | 2586600 A1 | 5/2013 |
| WO | 2013022534 A2 | 2/2013 |

OTHER PUBLICATIONS

"The Properties and Advantages of PTFE" (Jul. 19, 2016) (Year: 2016).*

(Continued)

*Primary Examiner* — Hana C Page
(74) *Attorney, Agent, or Firm* — MH2 Technology Law Group LLP

(57) ABSTRACT

A system for making highly contoured composite stringers, including a flexible stringer assembly to support an uncured composite stringer; and a contoured mandrel to contour the uncured composite stringer into a highly contoured shape, wherein the contoured mandrel comprises one or more curvatures with a radius of 100 inches or less along at least one of an x, y, or z axis.

20 Claims, 7 Drawing Sheets

(56) References Cited

U.S. PATENT DOCUMENTS

| | | | |
|---|---|---|---|
| 2011/0104432 A1 | 5/2011 | Duqueine et al. | |
| 2013/0340928 A1 | 12/2013 | Rotter et al. | |
| 2014/0314996 A1* | 10/2014 | Stewart | B64C 1/00 |
| | | | 428/152 |
| 2019/0127151 A1* | 5/2019 | Oguri | B65H 31/3036 |

OTHER PUBLICATIONS

"Vacuum Veneering: Tips, Tricks, and More" (Available Apr. 26, 2016) (Year: 2016).*
Extended European Search Report dated Dec. 10, 2020 in corresponding European Application No. 20185985.7, 9 pages.

* cited by examiner

HIGHLY CONTOURED COMPOSITE STRUCTURES AND SYSTEM AND METHOD FOR MAKING THE SAME

TECHNICAL FIELD

The present disclosure generally relates to the formation of highly contoured composite structures, and more particularly, to systems and methods for making highly contoured composite structures, such as composite stringers or stiffening elements.

BACKGROUND

Composite laminates are strong, light-weight, materials created by combining two or more functional components which are cured into a single structure. For example, a composite laminate may include a filler bound in a resin matrix. Resins used in composite materials may include thermoplastic or thermoset resins, such as epoxy resins. The fillers may be reinforcing or non-reinforcing in nature and may be in a variety of shapes, for example, powders, particulates, fibers tapes of unidirectional fibers, woven fabrics, and the like.

Composite stringers or stiffening elements are used in the aerospace industry to stiffen fuselage, skin, and/or wing sections of both commercial and military aircraft. However, wrinkles may often form when creating a highly contoured composite laminate, such as a composite stringer or stiffening element. Wrinkles are undesirable because they may result in voids or discontinuities in the cured composite laminate.

In the past, wrinkling has been reduced by employing expensive or time consuming methods and apparatus, such as cutting and splicing the plies forming the composite laminate in a manner that may ultimately have an undesirable effect on the cured composite.

Accordingly, there is a need for systems and methods to make highly contoured composite structures, such as composite stringers or stiffening elements, which also eliminate or reduce wrinkling in the final cured composite structure.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a system for making highly contoured composite stringers, including a flexible stringer assembly to support an uncured composite stringer; and a contoured mandrel to contour the uncured composite stringer into a highly contoured shape, wherein the contoured mandrel comprises one or more curvatures with a radius of 100 inches or less along at least one of an x, y, or z axis.

The system may further include a feeding chute to facilitate loading of the flexible stringer assembly onto the contoured mandrel.

The feeding chute may include one or more guide rails to support the flexible stringer assembly and to guide the flexible stringer assembly onto the contoured mandrel.

The feeding chute may have a melting point above 140° F.

The system may further include a heating source to heat the flexible stringer assembly.

At least one of the contoured mandrel and the feeding chute may be heated.

The flexible stringer assembly may be able to withstand temperatures up to 140° F. without melting.

The flexible stringer assembly may include a flexible caul; a support mandrel; a stabilization mesh; a flexible caul cover; and a vacuum bag.

The stabilization mesh may be configured to imprint a mesh pattern uniformly over outer surfaces of the uncured composite stringer when a vacuum and heat is applied to the flexible stringer assembly.

The flexible caul cover may be configured to re-shape according to changes in size or shape of the uncured composite stringer.

The flexible caul cover may be configured to deform in conjunction with the stabilization mesh.

The flexible caul cover may include a plurality of slits configured to accommodate changes to the shape of the uncured composite stringer.

The vacuum bag may be configured to apply a compaction force to the flexible stringer assembly to stabilize the uncured composite stringer and to help ensure that the flexible caul cover deforms in conjunction with the stabilization mesh as the flexible stringer assembly slides along the contoured mandrel.

The foregoing and/or other aspects and utilities embodied in the present disclosure may also be achieved by providing a method for making a highly contoured composite structure, including creating a flat charge; forming an uncured composite stringer from the flat charge; placing the uncured composite stringer into a flexible stringer assembly; applying a vacuum to the flexible stringer assembly; placing the flexible stringer assembly into a feeding chute; heating the flexible stringer assembly; sliding the heated flexible stringer assembly along a contoured mandrel; securing the heated flexible stringer assembly to the contoured mandrel; cooling the flexible stringer assembly to set the uncured composite stringer; removing the set uncured composite stringer; and curing the set uncured composite stringer.

The placing of the uncured composite stringer into the flexible stringer assembly may include placing a stabilization mesh on the uncured composite stringer; placing a support mandrel on the uncured composite stringer; placing a flexible caul cover on the uncured composite stringer; placing the uncured composite stringer on a flexible caul; and placing a vacuum bag over the uncured composite stringer.

The applying of a vacuum to the flexible stringer assembly may include subjecting the vacuum bag to a vacuum such that the vacuum bag applies a compaction force to the flexible stringer assembly to stabilize the uncured composite stringer and to help ensure than the flexible caul cover deforms in conjunction with the stabilization mesh as the flexible stringer assembly slides along the contoured mandrel.

The sliding of the heated flexible stringer assembly along the contoured mandrel may include moving the heated flexible stringer assembly along the contoured mandrel at a rate between about $\frac{1}{10}$ inch per minute and 6 inches per minute.

The cooling of the flexible stringer assembly to set the uncured composite stringer may include allowing the flexible stringer assembly to cool down to room temperature to set the uncured composite stringer into a contoured shape corresponding to the contoured mandrel.

The foregoing and/or other aspects and utilities embodied in the present disclosure may also be achieved by providing a highly contoured composite stringer; including one or more curvatures with a radius of 100 inches or less, wherein at least one of the one or more curvatures is in the z-axis.

The highly contoured composite stringer may be created according to a method including creating a flat charge; forming an uncured composite stringer from the flat charge; placing the uncured composite stringer into a flexible stringer assembly; applying a vacuum to the flexible stringer assembly; placing the flexible stringer assembly into a feeding chute; heating the flexible stringer assembly; sliding the heated flexible stringer assembly along a contoured mandrel; securing the heated flexible stringer assembly to the contoured mandrel; cooling the flexible stringer assembly to set the uncured composite stringer; removing the set uncured composite stringer; and curing the set uncured composite stringer.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
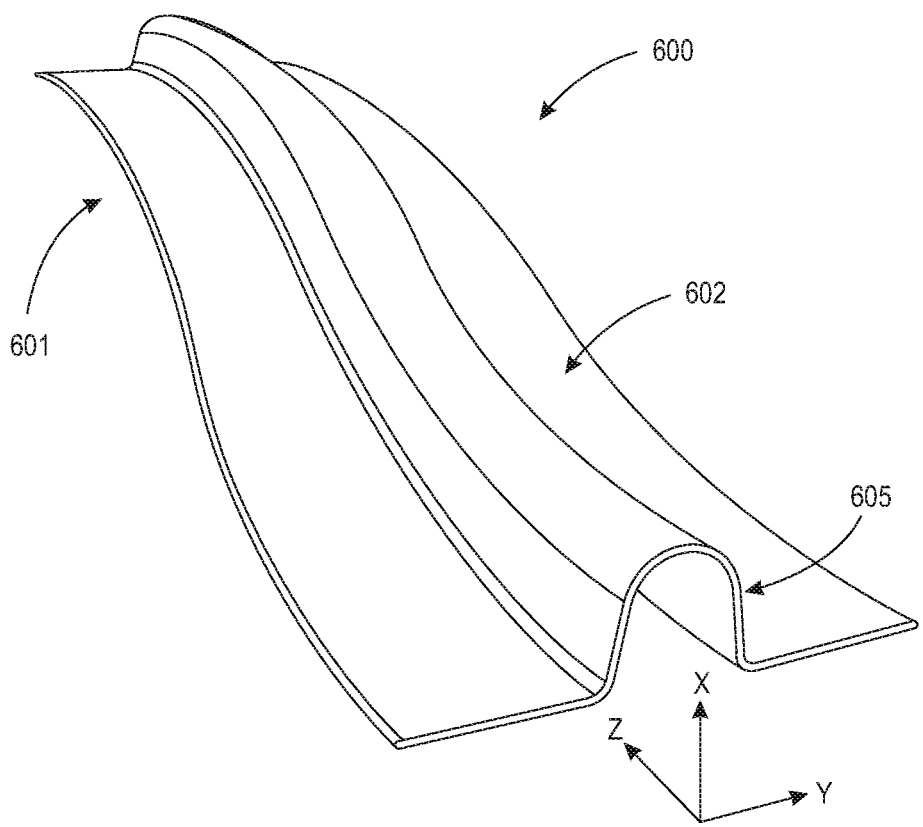
FIG. 1 illustrates a highly contoured composite stringer according to an implementation.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/ BB/C, AB/C, etc. In addition, throughout the specification, the meaning of "a," "an," and "the" include plural references. The meaning of "in" includes "in" and "on."

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

The inventors have created new systems and methods to make highly contoured composite structures, such as composite stringers or stiffening elements, while reducing or eliminating wrinkling in the final cured composite structures.

As used herein, the term highly contoured refers to the curvature of surfaces in the composite structure with respect to any one of the x, y, or z planes. A highly contoured composite structure has one or more curvatures with a radius of 120 inches or less. The highly contoured composite structure may have at least one curvature in the z-axis with a radius of 120 inches or less. The highly contoured composite structure may have at least one curvature with a radius of 100 inches or less.

For example, FIG. 1 illustrates a highly contoured composite stringer according to an implementation of the present disclosure. As illustrated in FIG. 1, a composite stringer 600 may have one or more convex or concave curvatures 601-602 in order to conform to a particular design. The composite stringer 600 may have only one curvature, whether convex or concave, or may have a plurality of convex or concave curvatures. The one or more convex or concave curvatures 601-602 may run along one or more of the x, y, or z axis. That is, the composite stringer 600 may simultaneously curve along one or more of the x, y, or z axis. For example, the composite stringer 600 may have a curvature along the z-axis. The composite stringer 600 may also rotate about one or more of the x, y, or z axis. For example, the composite stringer 600 may rotate about the y-axis while simultaneously having a curvature along the z-axis.

One or more of the convex or concave curvatures 601-602 may be highly contoured. For example, one or more of the curvatures 601-602 may have a radius of 120 inches or less, 110 inches or less, 100 inches or less, or 90 inches or less. The composite stringer 600 may have one or more concave curvatures 602 with a radius of 120 inches or less, 110 inches or less, 100 inches or less, or 90 inches or less. Similarly, the composite stringer 600 may have one or more convex curvatures 601 with a radius of 120 inches or less, 110 inches or less, 100 inches or less, or 90 inches or less.

As illustrated in FIG. 1, the composite stringer 600 may be an open hat-shaped composite stringer 600. That is, the composite stringer 600 may have an open hat-shaped profile 605 in cross-section. However, the composite stringer 600 may also have a variety or combination of other cross-sectional profile shapes (e.g. hat, Z, C, L, etc.).

While FIG. 1 illustrates a composite stringer 600 as an example of a composite structure, the present disclosure is not limited thereto, and other types of highly contoured composite structures may be created using the systems and methods of the present disclosure. For example, the highly contoured composite structures may include stringers, stiffeners, shear-ties, frames, ribs, spars, fittings, brackets, fuselage stiffening elements, wing elements such as wing blades and wing edges, empennage, engine nacelles, flight control surfaces, automobile assemblies, medical devices, sporting goods, etc.

Figure 2:
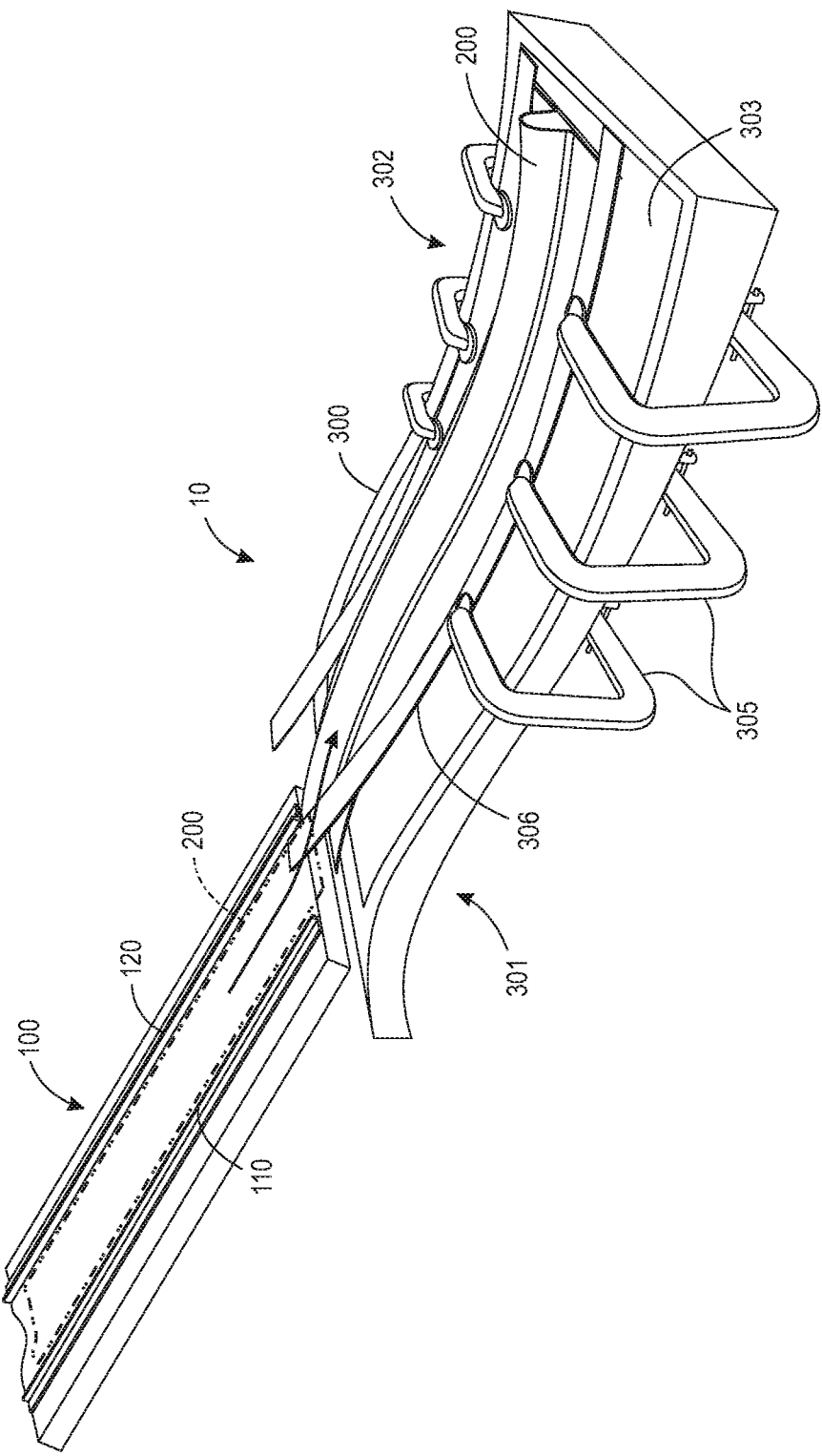
FIG. 2 illustrates a system for making a highly contoured composite structure according to an implementation.

FIG. 2 illustrates a system for making a highly contoured composite structure according to an implementation. In particular, FIG. 2 illustrates an implementation of a system 10 for making highly contoured composite stringers. As illustrated in FIG. 2, the system 10 includes a flexible stringer assembly 200 and a contoured mandrel 300. The flexible stringer assembly 200 may support an uncured composite stringer 500 and the contoured mandrel 300 may re-form the uncured composite stringer 500 into a highly contoured shape.

The system 10 may also include a feeding chute 100 to facilitate loading of the flexible stringer assembly 200 onto the contoured mandrel 300. The system 10 may also include a heat source 400 to heat the flexible stringer assembly 200 and/or an uncured composite stringer 500 supported by the flexible stringer assembly 200.

The contoured mandrel 300 may be highly contoured according to a desired design for a composite stringer 600 (see FIG. 1). For example, the contoured mandrel 300 may include one or more convex or concave curvatures 301-302. The one or more convex or concave curvatures 301-302 may run along one or more of the x, y, or z axis. That is, the contoured mandrel 300 may simultaneously curve along one or more of the x, y, or z axis. One or more of the convex or concave curvatures 301-302 may be highly contoured. For example, the curvatures 301-302 may have a radius of 120 inches or less, 110 inches or less, 100 inches or less, or 90 inches or less. The contoured mandrel 300 may include one or more curvatures with a radius of 120 inches or less along at least one of the x, y, or z axis.

The contoured mandrel 300 may be formed of a heat resistant material, such as Invar or a high temperature composite. The contoured mandrel 300 may also be made of wood, aluminum or high density tooling foam. In some implementations, the contoured mandrel 300 is capable of being heated, either internally or via exterior heating sources.

The one or more convex or concave curvatures 301-302 may be configured to form the one or more curvatures 601-602 on the composite stringer 600. For example, convex curvature 301 on the mandrel 300 may be configured to form convex curvature 601 on the composite stringer 600. Similarly, concave curvature 302 on the mandrel 300 may be configured to form concave curvature 602 on the composite stringer 600. A top surface 303 of the mandrel 300 may rotate about the z-axis along the length of the mandrel 300 to form a corresponding rotation about the z-axis along the length of the composite stringer 600. That is, the shape of the mandrel 300 may be configured to form the final desired shape of the composite stringer 600.

As described in more detail below, the flexible stringer assembly 200 supports an uncured composite stringer 500. The flexible stringer assembly 200 is configured to slide onto the contoured mandrel 300. The uncured composite stringer 500 may be initially formed straight, without any significant curvatures, then re-formed into a highly contoured shape by sliding the uncured composite stringer 500 onto the contoured mandrel 300.

The flexible stringer assembly 200 may be heat resistant. For example, the flexible stringer assembly 200 may be able to withstand temperatures up to about 200° F. without melting, such as, up to 180° F. or up to 160° F. In one implementation, the flexible stringer assembly 200 may be able to withstand temperatures up to 140° F. without melting. The flexible stringer assembly 200 may be configured to be heated, either internally or via exterior heating sources.

Once fully slid onto the contoured mandrel 300, the flexible stringer assembly 200 may be held in place for a predetermined period. For example, the flexible stringer assembly 200 may be held in place to allow cooling of the uncured composite stringer 500 to room temperature and/or to allow the uncured composite stringer 500 to settle to a semi-solid pre-cured state. In one implementation, the contoured mandrel 300 may include one or more clamps 305 to hold the flexible stringer assembly 200 in place after it has been fully slid onto the contoured mandrel 300. In other implementations, the contoured mandrel 300 may include one or more guide rails 306 to guide the flexible stringer assembly 200 onto the contoured mandrel 300 and/or to hold the flexible stringer assembly 200 in place after it has been fully slid onto the contoured mandrel 300.

The system 10 may include a feeding chute 100 to facilitate loading of the flexible stringer assembly 200 onto the contoured mandrel 300. The feeding chute 100 may be configured as a flat surface to support the flexible stringer assembly 200 before it is loaded onto the contoured mandrel 300. In some implementations, the feeding chute 100 may be configured to allow assembly of the flexible stringer assembly 200. For example, the feeding chute 100 may be a flat surface configured to support an uncured composite stringer 500, formed initially straight, as it is loaded into the flexible stringer assembly 200. As illustrated in FIG. 2, the feeding chute 100 may overlap a first portion of the contoured mandrel 300 to facility loading of the flexible stringer assembly 200 thereon.

The feeding chute 100 may be heat resistant. For example, the feeding chute 100 may be able to withstand temperatures up to 140° F., up to 180° F., and/or up to 200° F. without melting. In other implementations, the feeding chute 100 may have a melting point above 140° F., above 180° F., and/or above 200° F. The feeding chute 100 may also be configured to be heated, either internally or via exterior heating sources. While 140° F. is described in some of the implementations, the present disclosure is not limited thereto, and the maximum temperature resistance for the feeding chute 100 (and the contoured mandrel 300 and/or the flexible stringer assembly 200) may depend on the material of the uncured composite stringer 500. For example, the uncured composite stringer 500 may need to be heated to a temperature where the uncured composite stringer 500 can soften enough that it can form along the contoured mandrel 300 without wrinkling, but not to a temperature high enough to cause melting or permanent deformation to the uncured composite stringer 500 (or resulting composite stringer 600. However, depending on the material, the uncured composite stringer 500 may only need to be heated to an elevated temperature slightly above room temperature.

Figure 4:
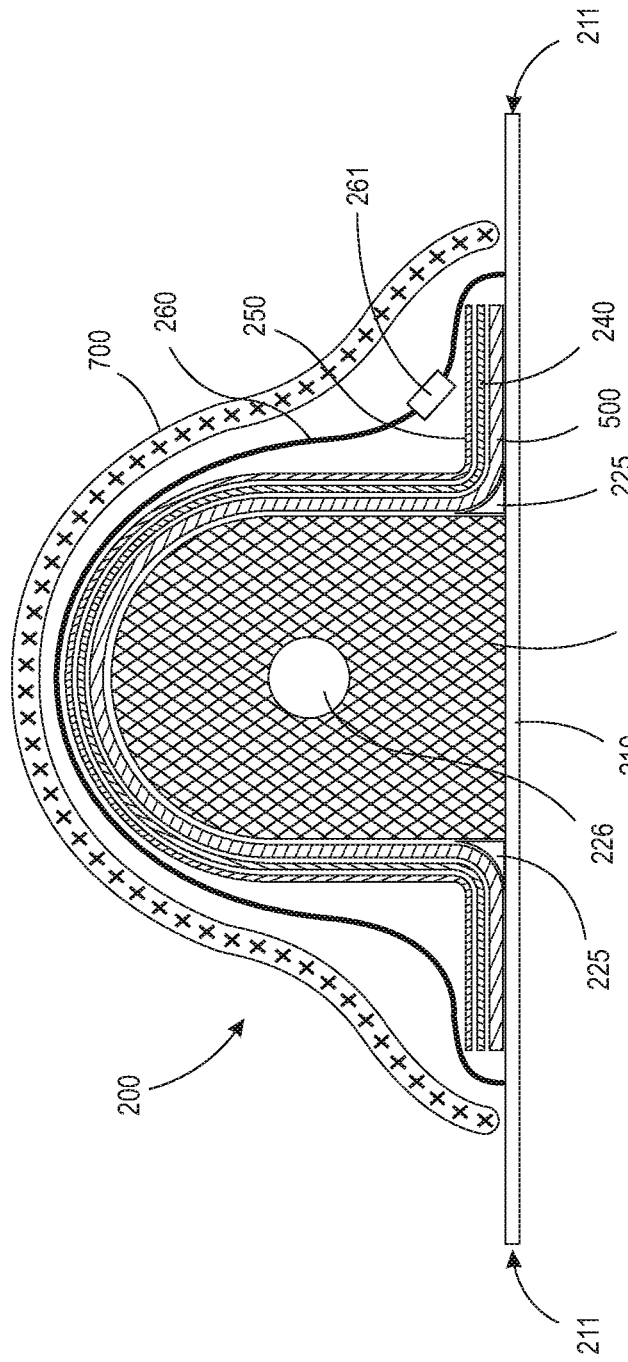
FIG. 4 illustrates a cross-sectional view of the flexible stringer assembly of FIG. 3.

As illustrated in FIGS. 2 and 4, the feeding chute 100 may include guide rails 110 to support the flexible stringer assembly 200 and/or to guide the flexible stringer assembly 200 onto the contoured mandrel 300. For example, as illustrated in FIG. 4, and as described in more detail below, the guide rails 110 may define channels 111 to receive a portion of the flexible stringer assembly 200. In particular, the channels 111 may be configured to receive exterior edges 211 of a flexible caul 210 of the flexible stringer assembly 200. The channels 111 may then guide the flexible caul 210 (and therefor the flexible stringer assembly 200) along the feeding chute 100 and onto the contoured mandrel 300.

As described above, the system 10 may include a heating source 400 (not illustrated). The heating source 400 may heat the flexible stringer assembly 200 and/or the uncured composite stringer 500 supported by the flexible stringer assembly 200. The heating source 400 may also heat at least one of the feeding chute 100 and/or the contoured mandrel 300 to heat the flexible stringer assembly 200 and/or the uncured composite stringer 500 supported by the flexible stringer assembly 200. The heating source 400 may be implemented as one or more heating blankets 700 placed over the flexible stringer assembly 200 while on the feeding chute 100 and/or the contoured mandrel 300. The heating source 400 may also be implemented as a heated feeding chute 100 and/or a heated contoured mandrel 300, by, for example, inductive or resistive heating. However, the present disclosure is not limited thereto, and the heating source 400 may be implemented as other sources of heat, such as heat lamps, heating susceptors, etc. The heating source 400 may maintain a temperature of the uncured composite stringer 500 while it is re-formed on the contoured mandrel.

Figure 3:
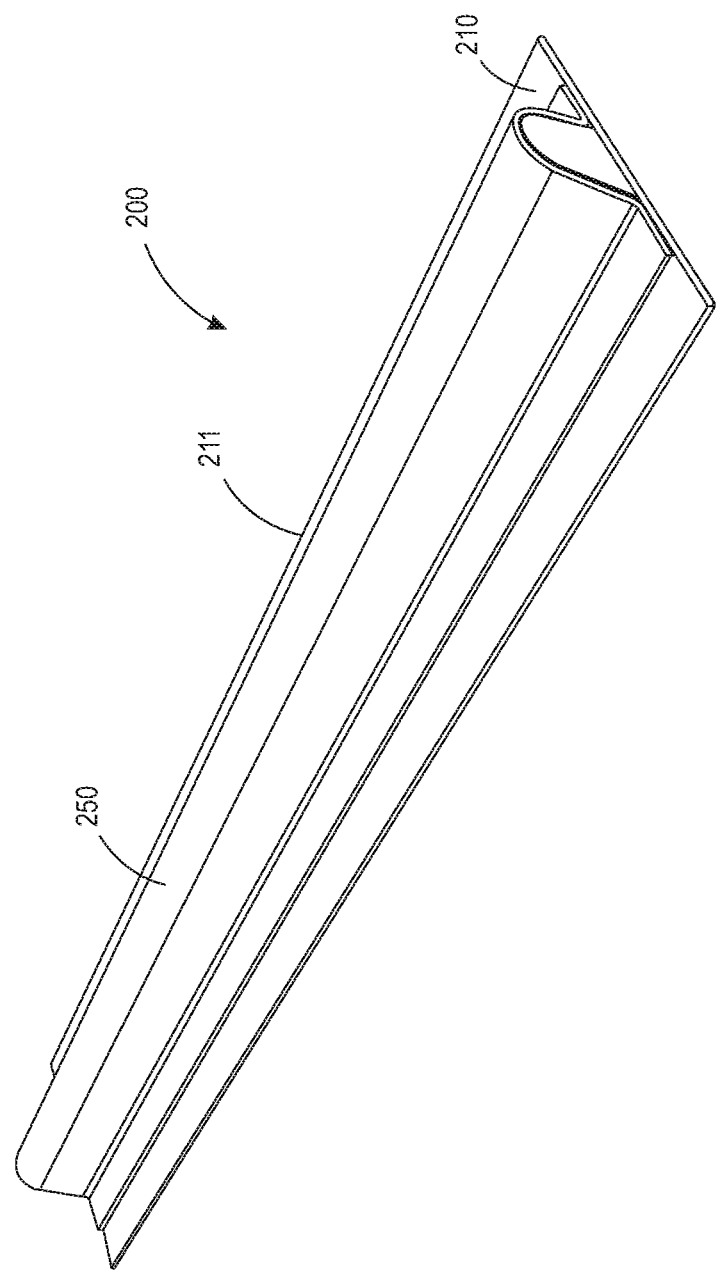
FIG. 3 illustrates a flexible stringer assembly according to an implementation.

FIG. 3 illustrates a flexible stringer assembly according to an implementation. FIG. 4 illustrates a cross-sectional view of the flexible stringer assembly of FIG. 3.

As illustrated in FIGS. 3-4, the flexible stringer assembly 200 supports an uncured composite stringer 500 and includes a flexible caul 210, a support mandrel 220, a stabilization mesh 240, a flexible caul cover 250, and a vacuum bag 260. The components of the flexible stringer assembly 200 may be heat resistant. For example, one or more of the flexible caul 210, support mandrel 220, stabilization mesh 240, flexible caul cover 250, and vacuum bag 260 may be configured to take temperatures up to 140° F., up to 180° F., and/or up to 200° F. without melting.

The uncured composite stringer 500 may be a composite laminate of a filler bound in a resin matrix. For example, the uncured composite stringer 500 may be made from unidirectional composite tape material impregnated with an epoxy resin ("pre-preg"). As used herein, the term "pre-preg" refers to pre-impregnated composite fiber plies, such as epoxy impregnated unidirectional composite tape. A pre-preg is flexible until it is cured, often by heat curing or curing within an autoclave.

In other implementations, the uncured composite stringer 500 may be made from woven fabric materials finished with a resin, such as fiberglass, carbon, or KEVLAR fabrics infused with an epoxy resin.

The uncured composite stringer 500 may be formed from a composite laminate by a variety of methods for forming composite stringers. For example, a multi-ply stack of pre-preg plies (a "charge") may be formed on a flat surface to the desired laminate specifications, and this flat charge can then be formed into a shaped stringer by punch or vacuum forming. Prior to punch forming, compaction and debulking methods may be used. In punch forming, the charge of pre-preg plies is stacked vertically and pressed, while heated, between a punch and a die configured to shape the charge to a particular cross-sectional profile (e.g. hat, Z, C, L, etc.). In vacuum forming, a charge of pre-preg plies is heated and placed over a mandrel configured to have a particular cross-sectional profile (e.g. hat, Z, C, L, etc.). A vacuum bag is then applied to force the charge to form around the mandrel and into the desired shape. Regardless of the method used to create the uncured composite stringer 500 that is to be contoured, the cross-section of the stringer must be formed in such a manner that it creates the desired cross-sectional profile without damaging the pre-preg by causing delamination, voids, wrinkles, and other types of defects that are detrimental to the resulting composite stringer 600.

The charge may be created manually, by hand lay-up, or via automated fiber placement (AFP) or automated tape layup (ATL) equipment, resin infusion, and the like.

The charge may incorporate particular ply layups to minimize an amount of wrinkling or to facilitate forming the uncured composite stringer 500 from a charge. For example, the pre-preg plies forming the charge may be laid up using traditional 0°, +45°, −45°, and 90° orientations. In some implementations, a non-traditional lay-ups (NTL) may be used. For example, the 0° plies may be replaced with slightly skewed (about +/−10°) plies to ease formation of the stringer from the charge and/or to avoid having too many plies of the same orientation stacked on top of one another. That is, using NTLs may decrease the overall strength of the laminate (because of the lack of 0° plies) but may provide some increased resistance to damage tolerance and inducing wrinkles. In some implementations, the charge comprises between 2 and 40 plies. In other implementations, the charge comprises 40 or less plies or 30 or less plies.

After forming, the uncured composite stringer is in an uncured state. That is, the uncured composite stringer 500 is ductile enough to be formed to various shapes/contours without any critical failure/delamination in the formed uncured composite stringer 500.

As illustrated in FIGS. 3-4, the flexible stringer assembly 200 includes a flexible caul 210. The flexible caul 210 is the base of the flexible stringer assembly 200 and supports an uncured composite stringer 500 placed thereon.

The flexible caul 210 is flexible and is configured to conform to the curvatures of the contoured mandrel 300. Similarly, the flexible caul 210 may be configured to easily slide along the contoured mandrel 300. For example, the material making at least one of the flexible caul 210 and/or the contoured mandrel 300 may be selected to minimize friction and facilitate movement of the flexible caul 210 along the contoured mandrel 300. In some implementations, a friction reducing or non-stick layer, such as a FEP (Teflon) layer may be added under the flexible caul 210 to facilitate sliding of the flexible caul 210 on the contoured mandrel 300.

The flexible caul 210 may be implemented as a flat plate formed of a composite material. For example, the flexible caul 210 may be formed of 2-4 plies of carbon tape impregnated with epoxy resin. In other implementations, the flexible caul may be formed of other flexible materials, such as sheet metal or plastics capable of conforming to the contoured mandrel 300 and able to withstand any temperature to which the flexible stringer assembly 200 and/or the uncured composite stringer 500 may be heated to.

As illustrated in FIGS. 2 and 4, the flexible caul 210 may include exterior edges 211. Exterior edges 211 may be configured to fit within and slide along channels 111 of the feeding chute and/or guide rails 306 of the contoured mandrel 300 to facilitate a movement of the flexible stringer assembly 200 along the feeding chute 100 and/or the contoured mandrel 300.

The flexible stringer assembly 200 also includes a support mandrel 220. As illustrated in FIG. 4, the support mandrel 220 is configured to support the uncured composite stringer 500 when placed on the flexible caul 210. In particular, the support mandrel 220 is placed within a cavity defined by the uncured composite stringer 500 to support the profile shape of the uncured composite stringer 500.

The support mandrel 220 may include a heat resistant flexible material, such as a silicon rubber or bladder, and may be shaped to support the particular profile shape of the uncured composite stringer 500 (e.g. hat, Z, C, L, etc.). In some implementations, the support mandrel 220 is configured to maintain a cross-section of the uncured composite stringer 500. The support mandrel 220 may also be configured to support the contour of the contoured mandrel 300 together with uncured composite stringer 500, and support the forming of the contour on the uncured composite stringer 500. The support mandrel 220 may also be able to withstand any temperature to which the flexible stringer assembly 200 and/or the uncured composite stringer 500 may be heated to.

Depending on the profile shape of the uncured composite stringer 500, in some implementations, the support mandrel 220 may include one or more radius fillers 225 to support an inner or outer portion of the uncured composite stringer 500. For example, as illustrated in FIG. 4, a radius filler 225 may be configured to support a flange radius 525 of the uncured composite stringer 500. That is, the radius filler 225 may be placed in a void created at the base of the open hat-shaped uncured composite stringer 500 underneath the curved portion that connects the hat to the flange. The radius filler 225 may be composed of a laminated composite (such as woven fabric reinforced plies) that is cut to shape to fill a radius gap and provide additional support and strength and reduce distortion of the uncured composite stringer 500 during forming. In some implementations, the support mandrel 220 may include a heating source 226 to provide heat to the uncured composite stringer 500.

The flexible stringer assembly 200 also includes a stabilization mesh 240. As illustrated in FIG. 4, the stabilization mesh 240 is placed over the uncured composite stringer 500.

The stabilization mesh 240 may be formed of a heat resistant material. For example, the stabilization mesh 240 may be stable up to 140° F. without melting. The stabilization mesh 240 may be flexible. For example, the stabilization mesh 240 be formed of a wire-type mesh and may be able to bunch or stretch in all directions as needed. The stabilization mesh 240 may be made of a heat resistant nylon or polyethylene. For example, polyethylene terephthalate (PET) mesh.

As described in more detail below, when a vacuum and/or heat are applied to the flexible stringer assembly 200, the stabilization mesh 240 may imprint a mesh pattern uniformly over the outer surfaces of the uncured composite stringer 500. While not bound in by any particular theory, the inventors believe that this uniform texturing helps prevent local geometry distortions that result in a wrinkles.

The flexible stringer assembly 200 also includes a flexible caul cover 250. As illustrated in FIG. 4, the flexible caul cover 250 is placed over the uncured composite stringer 500. That is, the flexible caul cover 250 is placed over the uncured composite stringer 500 already covered by the stabilization mesh 240.

The flexible caul cover 250 may be configured to be flexible and support a shape of the uncured composite stringer 500 as it slides along the contoured mandrel 300. For example, the flexible caul cover 250 may include a plurality of slits to accommodate contour changes. The slits may be limited in width (less than 0.015") to avoid pillowing when a vacuum and/or heat are applied to the flexible stringer assembly 200 and/or while the flexible stringer assembly 200 slides along the contoured mandrel 300. For example, the slits may minimize the creation of defects on the uncured composite stringer 500 while being formed on the contoured mandrel 300 or may drive any defects and/or wrinkles to a localized and controlled region defined by the slits.

The uncured composite stringer 500 may change in size or shape as it is re-formed on the contoured mandrel 300 under vacuum or heat. Accordingly, the flexible caul cover 250 may be similarly configured to re-shape according to the changes in size or shape of the uncured composite stringer 500.

The flexible caul cover 250 may be configured to deform in conjunction with the stabilization mesh 240. For example, the stabilization mesh 240 may stretch into the flexible caul cover 250 in a manner that coincides with the geometry displacement experienced by the uncured composite stringer 500 as it is slid along the contoured mandrel 300. The slits width and orientation may be selected to ensure than the flexible caul cover 250 deforms in conjunction with the stabilization mesh 240.

The flexible stringer assembly 200 also includes a vacuum bag 260. As illustrated in FIG. 4, the vacuum bag 260 is configured to surround the uncured composite stringer 500 and attaches to an upper surface of the flexible caul 210.

When a vacuum is applied, the vacuum bag 260 maintains the flexible stringer assembly 200. That is, the vacuum bag 260 applies a compaction force to the flexible stringer assembly 200 to stabilize the uncured composite stringer 500 and to help ensure than the flexible caul cover 250 deforms in conjunction with the stabilization mesh 240 as the flexible stringer assembly 200 slides along the contoured mandrel 300. The compaction force may also ensure that the flexible stringer assembly 200 stays tight to the contour of the contoured mandrel 300 while maintaining a shape of the uncured composite stringer 500. In some implementations, the vacuum bag 260 includes a vacuum port 261 to connect to a vacuum source.

Figure 5:
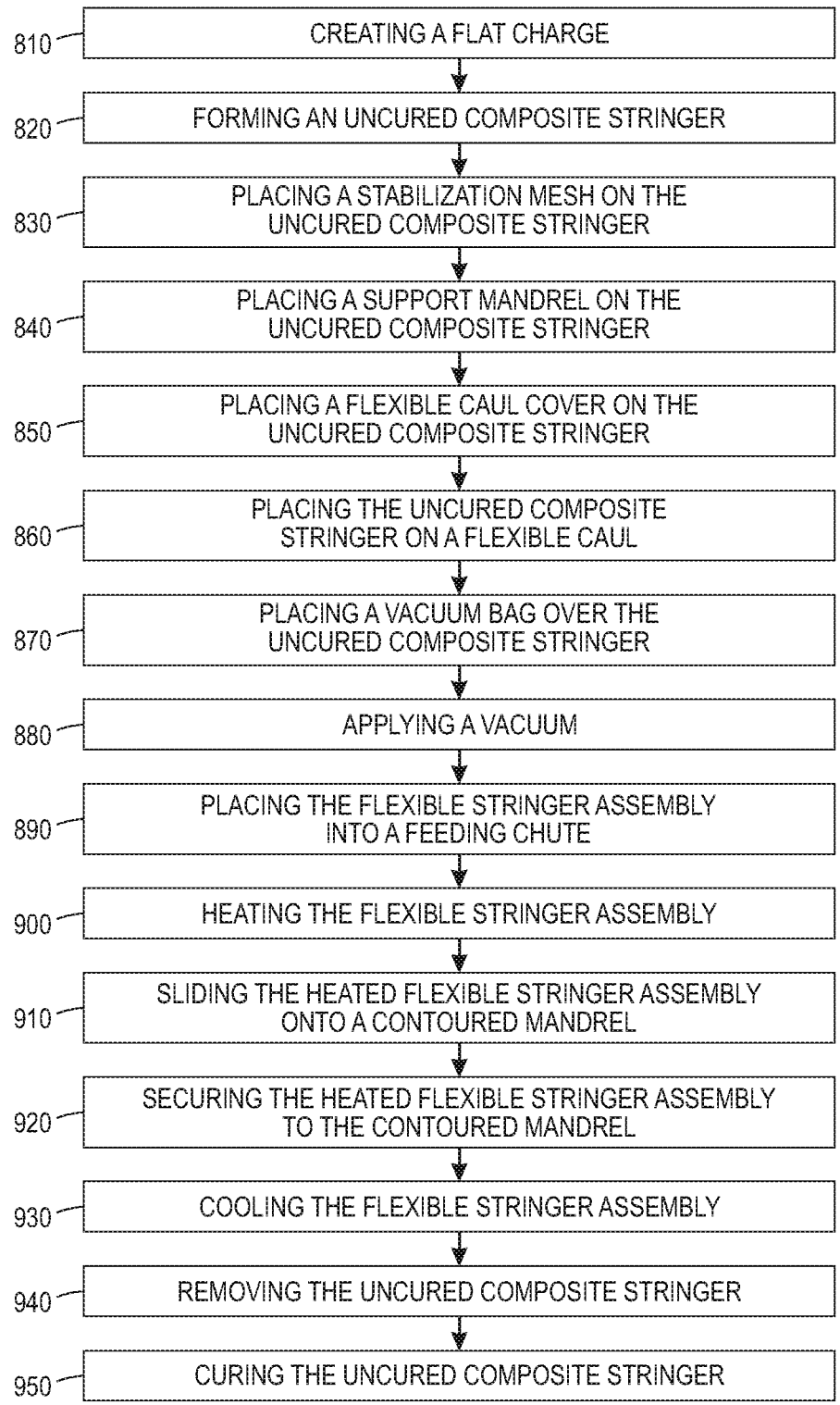
FIG. 5 illustrates a method for making a highly contoured composite structure according to an implementation of the present disclosure.

FIG. 5 illustrates a method for making a highly contoured composite structure according to an implementation of the present disclosure. For example, the highly contoured composite stringer of FIG. 1. As illustrated in FIG. 5, a method 800 to make a highly contoured composite structure may be described with respect to the system 10 of FIGS. 2-4.

The method 800 may begin with creating a flat charge in operation 810. For example, a flat charge may be created by stacking a multi-ply stack of pre-preg plies. The pre-preg plies may be assembled in a traditional lay up or in an NTL. The charge may be created manually or via automated lay-up (ATL or AFP) methods.

Operation 820 includes forming an uncured composite stringer from the flat charge. That is, the flat charge may be formed into an uncured composite stringer 500 in operation 820. For example, the flat charge may be heated and formed into an open hat-shaped uncured composite stringer 500 by punch or vacuum forming. The flat charge may be heated to a forming temperature, for example, to up to 140° F., in order to facilitate forming of the uncured composite stringer 500.

Operations 830-870 include placing the uncured composite stringer into a flexible stringer assembly. That is, after forming the uncured composite stringer 500, the uncured composite stringer 500 is placed into the flexible stringer assembly 200 in operations 830-870.

Operation 830 includes placing a stabilization mesh on the uncured composite stringer. That is, in operation 830, a stabilization mesh 240 may be placed on the uncured composite stringer 500. The stabilization mesh 240 may completely surround the exterior surfaces of the uncured composite stringer 500.

Operation 840 includes placing a support mandrel on the uncured composite stringer. That is, in operation 840, a support mandrel 220 may be placed within the uncured composite stringer 500. For example, the support mandrel 220 may be placed within the cavity defining the open hat-shaped uncured composite stringer 500. In another example, the support mandrel 220 is placed upon a flexible caul 210, and the uncured composite stringer 500 may be placed over the support mandrel 220. In some implementations, a separator or intermediate material, such as FEP, is placed between the support mandrel 220 and the uncured composite stringer 500 to separate both part and/or prevent them from bonding.

Operation 850 includes placing a flexible caul cover on the uncured composite stringer. That is, in operation 850, a flexible caul cover 250 may be placed over the uncured composite stringer 500. The uncured composite stringer 500 may already be covered by the stabilization mesh 240, and the flexible caul cover 250 may be placed over the stabilization mesh 240. The flexible caul cover 250 may have a plurality of slits to accommodate changes to the contour of the uncured composite stringer 500.

Operation 860 includes placing the uncured composite stringer on a flexible caul. That is, in operation 860, the uncured composite stringer 500 may be placed upon a flexible caul 210. The uncured composite stringer 500 may already be surrounded by the stabilization mesh 240 and the flexible caul cover 250 when placed on the flexible caul 210.

Operation 870 includes placing a vacuum bag over the uncured composite stringer. That is, in operation 870, a vacuum bag 260 may be placed over the uncured composite stringer 500 and secured to an upper surface of the flexible caul 210. In some implementations, a breather material may be placed over the stabilization mesh 240 and the flexible caul cover 250 to facilitate pulling of a vacuum.

Operation 880 includes applying a vacuum to the flexible stringer assembly. That is, in operation 880, a vacuum may be applied to the vacuum bag 260 of the flexible stringer assembly 200. The vacuum bag 260 may apply a compaction force to the components of the flexible stringer assembly 200 to stabilize the uncured composite stringer 500 and to help ensure than the flexible caul cover 250 deforms in conjunction with the stabilization mesh 240 as the flexible stringer assembly 200 slides along the contoured mandrel 300.

Operation 890 includes placing the flexible stringer assembly into a feeding chute. That is, the flexible stringer assembly 200 may be loaded into a feeding chute 100 in operation 890. For example, exterior edges 211 of the flexible caul 210 may be placed within channels 111 of the feeding chute 100 to load the flexible stringer assembly 200 into the feeding chute 100.

Operation 900 includes heating the flexible stringer assembly. For example, the flexible stringer assembly 200 may be heated to 140° F. while maintaining a full vacuum. At least one of the feeding chute 100 and the contoured mandrel 300 may also be heated or pre-heated to maintain the flexible stringer assembly 200 to 140° F. The flexible stringer assembly 200 may be heated directly via heating blankets 700 placed over the flexible stringer assembly 200 (see FIG. 4) and/or indirectly by heating at least one of the feeding chute 100 and the contoured mandrel 300.

Operation 910 includes sliding the heated flexible stringer assembly along a contoured mandrel. The heated flexible stringer assembly 200 may be slid along the contoured mandrel 300 in operation 910. For example, a puller strap (not illustrated) may be attached to the flexible stringer assembly 200, and a linear motor (not illustrated) may be used to pull the flexible stringer assembly 200 from the feeding chute 100 along the contoured mandrel 300.

The heated flexible stringer assembly 200 is moved slowly along the contoured mandrel 300. For example, the heated flexible stringer assembly 200 may be moved at a rate between about 1/10 inch per minute and 6 inches per minute. The heated flexible stringer assembly 200 may be moved at a rate up to 20 inches per minute, up to 10 inches per minute, or up to 6 inches per minute. However, the present disclosure is not limited thereto, and different moving rates may be applied according to the material of the uncured composite stringer 500. While not bound to any particular theory, the inventors believe that the speed depends on the resin in the composite pre-preg and the level of contour. Generally, the slower you form the composite stringer to the contoured mandrel, the greater the reduction in the number and magnitude of the wrinkles. A slower forming speed should also be used for smaller (tighter) radii curvatures and/or stiffer composite materials or laminates.

The contoured mandrel 300 may include guide rails 306 to receive the exterior edges 211 and guide the flexible stringer assembly 200 along the contoured mandrel 300 and/or to hold the flexible stringer assembly 200 in place after it has been fully slid onto the contoured mandrel 300.

Operation 920 includes securing the heated flexible stringer assembly to the contoured mandrel. That is, in operation 920, the heated flexible stringer assembly 200 may be secured to the contoured mandrel 300. After the heated flexible stringer assembly 200 has been fully slid into place along the contoured mandrel 300, the curvatures 301-302 of the contoured mandrel may correspond to the location of the curvatures 601-602 in the desired composite stringer 600. The heated flexible stringer assembly 200 may be then secured to the contoured mandrel 300. The heated flexible stringer assembly 200 may be secured using the guide rails 306 or via a plurality of clamps 305 securing the exterior edges 211 of the flexible caul 210 to the contoured mandrel 300.

Operation 930 includes cooling the flexible stringer assembly to set the uncured composite stringer. That is, in operation 930, the heated flexible stringer assembly 200 may be allowed to cool-down to set the uncured composite stringer 500. For example, the flexible stringer assembly 200 is allowed to cool down to room temperature and the uncured composite stringer 500 is allowed to set into the contoured shape corresponding to the contoured mandrel 300. The flexible stringer assembly 200 may cool down for about 20 mins to ½ hour to reach near room temperature.

Operation 940 includes removing the set uncured composite stringer. In operation 940, the uncured composite stringer 500 may be removed from the flexible stringer assembly 200. For example, once the uncured composite stringer 500 has reached room temperature, the uncured composite stringer 500 has set into the contoured shape corresponding to the contoured mandrel 300. Vacuum is no longer applied to the vacuum bag 260 and the set uncured composite stringer 500 is then removed from the flexible stringer assembly 200. The set uncured composite stringer 500 may display a uniform texture of corrugations corresponding to the stabilization mesh 240. As described above, this uniform texture is accomplished by stretching the stabilization mesh 240 together with the flexible caul cover 250, and reduces the formation of wrinkles on the uncured composite stringer 500 and the resulting cured composite stringer 600.

Operation 950 includes curing the set uncured composite stringer. The set uncured composite stringer 500 may be cured using an autoclave and a vacuum bag under processing conditions corresponding to the material of the uncured composite stringer 500. After curing, the uncured composite stringer 500 is cured into the composite stringer 600 of FIG. 1.

Generally, any surface defect or wrinkle over 0.010 inches may indicate a degradation in structural strength for a composite structure. However, a composite stringer 600 according to embodiments of the present disclosure may have significantly reduced wrinkling. For example, when compared to other methods of fabricating a highly contoured composite stringer, composite stringer 600 may display a significant reduction in the quantity and size of any wrinkles present.

Figure 6:
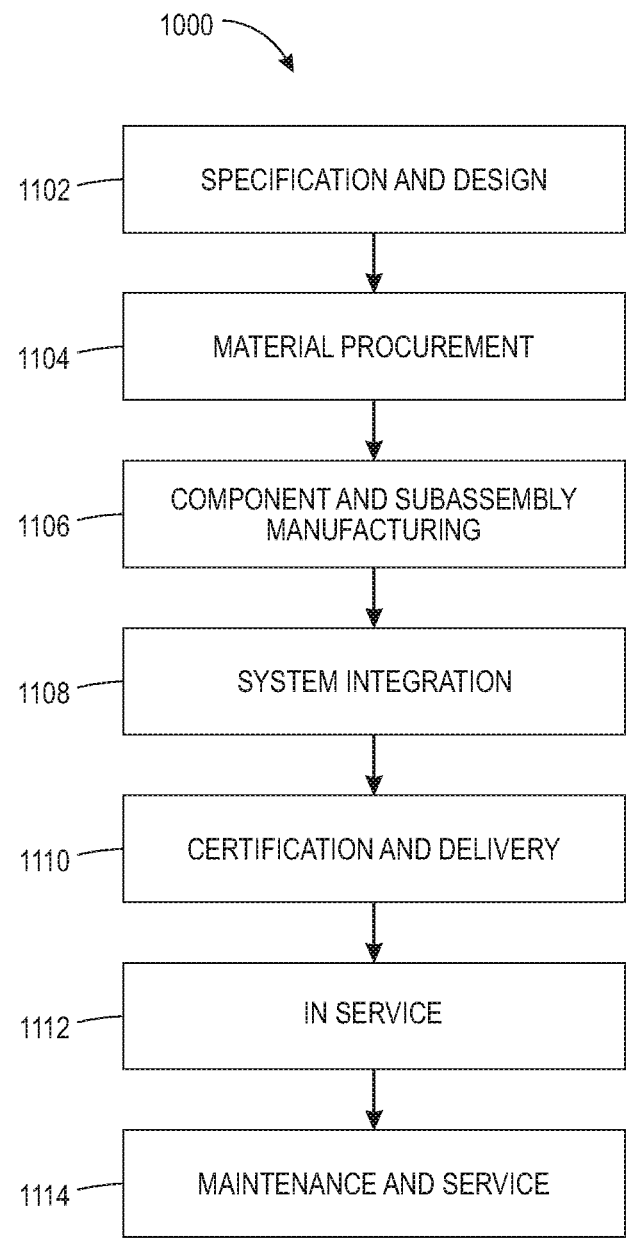
FIG. 6 illustrates a flow diagram of aircraft production and service methodology.
Figure 7:
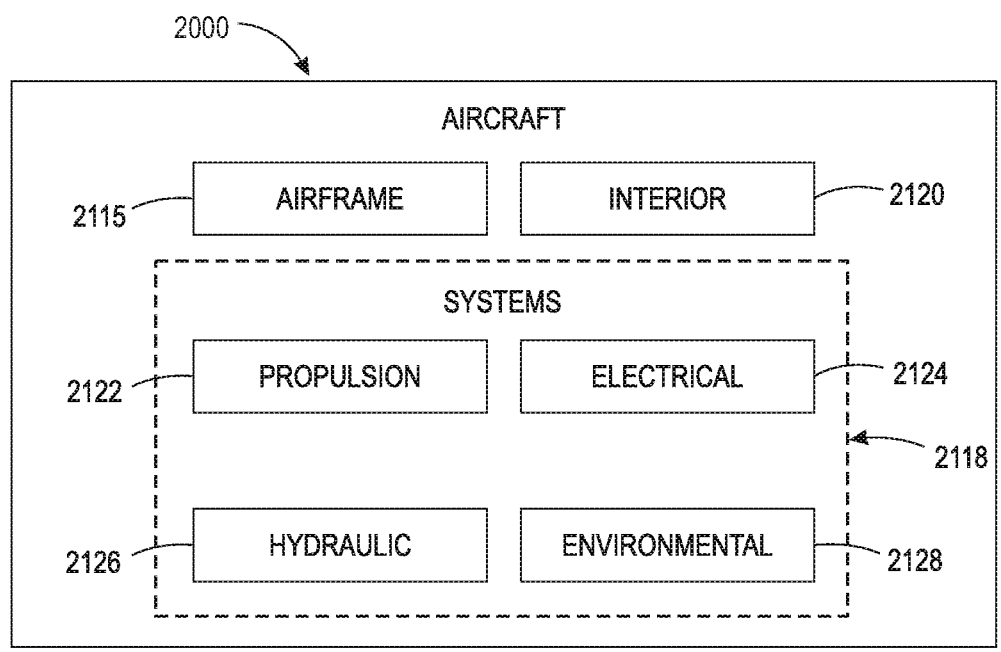
FIG. 7 illustrates a block diagram of an aircraft.

Implementations of the disclosure may find use in a variety of potential applications, particularly in the transportation industry, including for example, aerospace, marine, automotive applications, and other application where formation of highly contoured composite structures is desired. Thus, referring now to FIGS. 6 and 7, implementations of the disclosure may be used in the context of an aircraft manufacturing and service method 1000 as shown in FIG. 6 and an aircraft 2000 as shown in FIG. 7. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 2000 produced by exemplary method 1000 may include an airframe 2116 with a plurality of systems 2118 and an interior 2120. Examples of high-level systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods embodied herein may be employed during any one or more of the stages of the production and service method 1000. For example, components or subassemblies corresponding to production process 1106 may be fabricated or manufactured in a manner similar to components or subassemblies produced while the aircraft 2000 is in service. Also, one or more apparatus embodiments, method embodiments, or a combination thereof may be utilized during the production stages 1106 and the 1108, for example, by substantially expediting assembly of or reducing the cost of an aircraft 2000. Similarly, one or more of apparatus embodiments, method embodiments, or a combination thereof may be utilized while the aircraft 2000 is in service, for example and without limitation, to maintenance and service 1114.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof

What is claimed:

1. A system for making highly contoured composite stringers, comprising:
a flexible stringer assembly to support an uncured composite stringer having a cross-sectional profile shape; and
a contoured mandrel to contour the uncured composite stringer into a highly contoured shape,
wherein the contoured mandrel comprises one or more curvatures with a radius of 100 inches or less along at least one of an x, y, or z axis,
wherein the contoured mandrel comprises one or more guide rails to guide the flexible stringer assembly along the contoured mandrel;
wherein the flexible stringer assembly comprises a flexible caul having one or more exterior edges configured to fit within and slide along the one or more guide rails of the contoured mandrel and a support mandrel placed within a cavity defined by the uncured composite stringer and configured to support the profile shape of the uncured composite stringer when the uncured composite stringer is placed on the flexible caul, and
wherein the uncured composite stringer is re-formed into a highly contoured shape by sliding the uncured composite stringer onto the contoured mandrel.

2. The system of claim 1, further comprising a feeding chute to facilitate loading of the flexible stringer assembly onto the contoured mandrel.

3. The system of claim 2, wherein the feeding chute comprises one or more feeding chute guide rails, and
wherein the one or more exterior edges are configured to fit within and slide along the one or more feeding chute guide rails to support the flexible stringer assembly and to guide the flexible stringer assembly onto the contoured mandrel.

4. The system of claim 2, wherein the feeding chute has a melting point above 140° F.

5. The system of claim 1, further comprising a heating source to heat the flexible stringer assembly.

6. The system of claim 2, wherein at least one of the contoured mandrel and the feeding chute is heated.

7. The system of claim 1, wherein the flexible stringer assembly is able to withstand temperatures up to 140° F. without melting.

8. The system of claim 1, wherein the flexible stringer assembly comprises:
the flexible caul configured to slide along the contoured mandrel;
the support mandrel configured to support the cross-sectional profile shape of the uncured composite stringer and placed on the flexible caul;
a stabilization mesh placed over the uncured composite stringer;
a flexible caul cover placed over the stabilization mesh and the uncured composite stringer; and
a vacuum bag,
wherein the flexible caul cover and the support mandrel are configured to support a shape of the uncured composite stringer as it slides along the contoured mandrel.

9. The system of claim 8, wherein the stabilization mesh is configured to imprint a mesh pattern uniformly over outer surfaces of the uncured composite stringer when a vacuum and heat is applied to the flexible stringer assembly.

10. The system of claim 8, wherein the flexible caul cover is configured to re-shape according to changes in size or shape of the uncured composite stringer as the uncured composite stringer slides along the contoured mandrel.

11. The system of claim 8, wherein the flexible caul cover is configured to deform in conjunction with the stabilization mesh as the uncured composite stringer slides along the contoured mandrel.

12. The system of claim 8, wherein the flexible caul cover comprises a plurality of slits configured to accommodate changes to the shape of the uncured composite stringer as the uncured composite stringer slides along the contoured mandrel.

13. The system of claim 8, wherein the vacuum bag is configured to apply a compaction force to the flexible stringer assembly to stabilize the uncured composite stringer and to help ensure that the flexible caul cover deforms in conjunction with the stabilization mesh as the flexible stringer assembly slides along the contoured mandrel.

14. The system of claim 1, wherein the flexible stringer assembly comprises:
a stabilization mesh placed over the uncured composite stringer.

15. The system of claim 14, wherein the stabilization mesh is configured to imprint a mesh pattern uniformly over outer surfaces of the uncured composite stringer when a vacuum and heat is applied to the flexible stringer assembly.

16. The system of claim 1, wherein the flexible stringer assembly comprises:
the flexible caul configured to slide along the contoured mandrel;
the support mandrel configured to support the cross-sectional profile shape of the uncured composite stringer and placed on the flexible caul;
a flexible caul cover placed over the uncured composite stringer; and
a vacuum bag,
wherein the flexible caul cover and the support mandrel are configured to support a shape of the uncured composite stringer as it slides along the contoured mandrel.

17. The system of claim 16, wherein the flexible stringer assembly comprises:
a stabilization mesh placed over the uncured composite stringer.

18. The system of claim 17, wherein the flexible caul cover is placed over the stabilization mesh and the uncured composite stringer.

19. The system of claim 18, wherein the flexible caul cover is configured to deform in conjunction with the stabilization mesh as the uncured composite stringer slides along the contoured mandrel.

20. The system of claim 16, wherein the flexible caul cover is configured to re-shape according to changes in size or shape of the uncured composite stringer as the uncured composite stringer slides along the contoured mandrel.

* * * * *

UNITED STATES PATENT AND TRADEMARK OFFICE
CERTIFICATE OF CORRECTION

| | |
|---|---|
| PATENT NO. | : 11,745,442 B2 |
| APPLICATION NO. | : 16/548466 |
| DATED | : September 5, 2023 |
| INVENTOR(S) | : Michael J. Rossi et al. |

It is certified that error appears in the above-identified patent and that said Letters Patent is hereby corrected as shown below:

In the Claims

Claim 7, at Column 15, Line 44, "F." should be --F--.

Signed and Sealed this
Third Day of October, 2023

Katherine Kelly Vidal
*Director of the United States Patent and Trademark Office*